United States Patent [19]

Wood et al.

[11] Patent Number: 4,744,421
[45] Date of Patent: May 17, 1988

[54] INFLATABLE PACKER SYSTEMS

[75] Inventors: Edward T. Wood, Kingwood; William T. Bell, Huntsville; Bob V. Barker, Houston, all of Tex.

[73] Assignee: Completion Tool Company, Houston, Tex.

[21] Appl. No.: 481,581

[22] Filed: Apr. 1, 1983

[51] Int. Cl.$^4$ .......................................... E21B 33/127
[52] U.S. Cl. .................................... 166/387; 166/187; 277/34; 277/72 FM
[58] Field of Search ............... 166/387, 250, 179, 185, 166/122, 337; 277/9.5, 34, 34.3, 34.6, 72 FM

[56] References Cited

U.S. PATENT DOCUMENTS

| 3,437,142 | 4/1969 | Conover | 166/187 |
| 3,477,506 | 11/1969 | Malone | 166/187 |
| 3,915,227 | 10/1975 | Simpson | 277/34.6 |
| 3,918,522 | 11/1975 | Suman, Jr. | 166/285 |
| 4,244,590 | 1/1981 | Sanford | 277/34.3 |
| 4,420,159 | 12/1983 | Wood | 166/187 |

FOREIGN PATENT DOCUMENTS 0766516 1/1957 United Kingdom .......... 277/72 FM

Primary Examiner—Stephen J. Novosad
Assistant Examiner—William P. Neuder

[57] ABSTRACT

Disclosed is a method of preparing an inflatable packer including a mandrel and a sleeve for insertion into a fluid filled well bore. The method includes pressure testing the sleeve and its connection with the mandrel with a gas without introducing any incompressible fluid between the area of contact between the sleeve and mandrel. The method also includes the filling any pressure vulnerable areas in the packer not in the area of contact of the sleeve and mandrel with an incompressible fluid.

12 Claims, 1 Drawing Sheet

INFLATABLE PACKER SYSTEMS

BACKGROUND OF THE INVENTION

A. Field of the Invention

The present invention relates generally to infaltable packers for use in oil and gas wells for providing annular seals between the outside of pipe and the surrounding surface of the borehole or casing, and more particularly to a method an inflatable packer and of preparing an inflatable packer having a long inflatable sleeve for insertion into a fluid filled well bore. The method insures that the inflatable sleeve does not creep or expand with respect to the mandrel due to frictional or other forces during running.

B. Description of the Prior Art

Inflatable packers of the type disclosed, for example, in U.S. Pat. No. 3,640,723, or U.S. Pat. No. 3,837,947, have been used for many years. Such packers include a tubular mandrel that is covered by an inflatable sleeve secured to the mandrel by a pair of axially spaced apart end assemblied. Each end assembly includes a collar, which is adapted to be connected to the mandrel, and an annular head, which is connected to one end to the collar, and at the other end to the sleeve. The sleeve is normally reinforced by a reinforcing sheath, which comprises a plurality of overlapping ribs connected at each end to a head. The heads are spaced radially apart from the mandrel, thereby to form an annular cavity radially inside the heads. A passage with valve means is provided in one of the collars for allowing the passage of fluid from inside the pipe string to one of the annular cavities and thence between the inflatable sleeve and the mandrel to inflate the sleeve into sealing contact with the well bore or casing. Such inflatable packers function to isolate the annulus above the packer from that below, and, accordingly, need be only of a length long enough to form an effective seal.

More recently, there have been developed inflatable packers for use in well completion, which are adapted to be positioed adjacent the producing zone and inflated with cement. After the cement has set, the packer is perforated and the well is produced through the packer. Examples of such inflatable packers are disclosed, for example, in U.S. Pat. No. 3,918,522, U.S. Pat. No. Re. 30,711, and U.S. Pat. No. 3,909,034. Such inflatable packers tend to be relatively long, i.e. from ten feet to forty feet in length, in order to seal against both the producing formation, which is perforated, and the formations above and below the producing formation.

Since the completion type inflation packers are of such length the central portion of the inflatable sleeve is supported and, in effect, reinforced by the borehole. Accordingly, a reinforcing sheath is unnecessary in the central part of the inflatable sleeve. However, reinforcing is necessary adjacent the ends of the inflatable sleeve to prevent the inflatable sleeve from blowing out and/or extruding past the heads. Therefore, the inflatable sleeves of the completion type packers are normally reinforced only at the ends adjacent to the heads.

Inflatable packers are intended for use in high pressure environments. Since the well bores into which teh packers are run are filled with drilling fluid, or the like, during running and prior to inflation, the packers may be subjected to extremem hydrostatic pressures. Additionally, during inflation, the inflating fluid or cement is injected into the packer at a pressure substantially higher than the local hydrostatic pressure. Accordingly, inflatable packers must be constructed and prepared so as to be able to withstand both hydrostatic and inflation pressures. The primary failure point due to hydrostatic pressures is at the heads. It will be recalled that the heads are spaced radially apart from the mandrel to define a cavity. If the cavity is maintained at a pressure substantially equal to atmospheric, then the extreme hydrostatic pressures in the well bore can apply collapsing forces to the heads. The primary failure points due to inflation pressures are at the connections between the collars and heads, and heads and sleeves, and bursting of the sleeve itself.

In order to prepare inflatable packers for high pressure service, such packers heretofore have been tested hydrostatically at pressures on the order of the differentials experienced during inflation. During such hydrostatic testing, the packers have been filled with a test fluid, which is usually water, at an appropriate pressure. After hydrostatic testing, a portion, but not all, of the test fluid is drained out. After such draining, the portion of the packer exterior of the mandrel, including the inflatable sleeve and heads, remains filled with fluid. The hydrostatic forces within the well bore act on the retained fluid and substantially equalize the pressure within the cavity or chamber within the heads, thus preventing collapse of the heads.

The above described hydrostatic testing and fluid filling procedure has been effective inpreventing or reducing the number of occurrences of pressure related failures. However, such procedure has contributed to or exacerbated another failure point in inflatable packers. As inflatable packers are run into the well bore, there is sometimes contact between the inflatable sleeve and the borehole wall. Such contact is particularly likely in deviated holes. Contact between the sleeve and the borehole wall during movement causes frictional forces to be applied to the sleeve. Such contact also causes frictional forces to be applied between the interior of the sleeve and the mandrel. If the frictional forces between the exterior of the sleeve and the borehole wall are greater than those between the interior of the sleeve and the mandrel, the sleeve will tend to move with respect to the mandrel. It is well known in general that the magnitude of the frictional force between two surfaces may be expressed by the following equation:

$$F_f = \mu F_n$$

where
 $F_f$ is the frictional force;
 $\mu$ is the coefficient of friction between the surfaces; and
 $F_n$ is the normal force between the surfaces.

In the case of an inflatable packer being inserted into a well bore, the frictional force between the sleeve and the well bore is expressed as follows:

$$F_{fsw} = \mu_{sw} F_{nsw}$$

where
 $F_{fsw}$ is the frictional force between the sleeve and well bore;
 $\mu_{sw}$ is the coefficient of friction between the sleeve and the well bore; and
 $F_{nsw}$ is the normal force between the sleeve and the well bore.

The frictional force between the interior surface of the sleeve and the mandrel may be expressed by the following equation:

$$F_{fsm} = \mu_{sm}(F_{nsm} + F_h)$$

where $F_{fsm}$ is the frictional force between the sleeve and the mandrel;

$\mu_{sm}$ is the coefficient of friction between the sleeve and the mandrel;

$F_{nsm}$ is the normal force between the sleeve and the mandrel due to contact of the sleeve with the well bore; and $F_H$ is the force due to any hydrostatic pressure differential between the outside of the sleeve and the inside of the sleeve.

The equation expressing the frictional force between the sleeve and mandrel may be rewritten as follows:

$$F_{fsm} = \mu_{sm}F_{nsm} + \mu_{sm}F_h$$

The frictional force between the sleeve and mandrel thus has two terms: $\mu_{sm}F_{Nsm}$ and $\mu_{sm}F_H$. If the pressure within the sleeve is balanced to be equal to that outside the sleeve, as when there is an incompressible fluid such as water between the sleeve and mandrel, the second term is zero. Thus, when hydrostatic forces are eliminated or balanced, the frictional force between the sleeve and the mandrel may be expressed as follows:

$$F = _{fsm} = \mu_{sm}F_{Nsm}$$

It will be noted that with respect to both the frictional forces between the sleeve and wall bore and the mandrel and the sleeve, the normal forces, $F_{NSW}$ and $F_{NSM}$ respectively, are equal. Thus, in order for the frictional force between the sleeve and the mandrel to be greater than the frictional force between the sleeve and the well bore the coefficient of friction of the sleeve with respect to the mandrel $\mu_{SM}$, must be greater than the coefficient of friction of the sleeve with respect to the well bore $\mu_{SW}$.

The coefficient of friction for contact between dry steel and rubber is somewhat higher than that between rubber and the wall of a fluid filling well bore; however, the coefficient of friction for contact between wet steel and rubber may be smaller. Thus, when there is water between the mandrel and the sleeve, the combined effects of lubrication by reducing the coefficient of friction and pressure balancing produce a frictional force between the sleeve and the mandrel that may be much less than that between the sleeve and well bore. In such instances, frictional forces applied to the sleeve by the well bore cause the sleeve to move with respect to the mandrel. Such movement can cause thickening of the sleeve at the upper end of the inflatable packer and can deform outwardly the upper reinforcing material. In some instances, the movement of the sleeve along the mandrel can cause the diameter of the packer to become greater than that of the borehole, in which case the packer becomes stuck.

A further failure mode due to the presence of fluid between the sleeve and mandrel has been noted and is believed to be due to the hydrodynamic forces acting on the packer as it is moved downwardly in the well bore. The movement of the packer through the well fluid within the well bore sets up regions of relatively higher and lower pressure axially along the length of the packer. Fluid between the sleeve and the mandrel flows from regions of higher pressure to those of lower pressure. These hydrodynamic forces tend to squeeze or milk fluid axially upwardly. In some instance, the movement of fluid between the sleeve and mandrel partially inflates the upper end of the sleeve to a diameter greater than that of the borehole, in which case, again, the packer becomes stuck.

It is therefore an object of the present invention to provide a method of preparing an inflatable packer for running in a fluid filled well bore which protects the packer from damage due to hydrostatic well bore pressures, but which prevents movement of the sleeve with respect to the mandrel.

SUMMARY OF THE INVENTION

Briefly stated, the foregoing and other objects are accomplished by filling only the vulnerable end assemblied with an incompressible fluid and eliminating any fluid between the area of contact between the sleeve and the mandrel. Preferably, the packer is first pressure tested by partially inflating the sleeve with a pressurized gas, as for example, air. After it has been determined that the packer does not leak, the air is relieved and a vacuum is drawn at both end assemblies. The end assemblies are then vacuum filled with an incompressible fluid. Preferably, the fluid is a viscous grease or gel like material that flows under relatively high pressure, but has sufficient gel strength as not to flow under atmospheric pressures. The vacuum filling insures that great flows to fill substantially all of the void spaced within the end assemblies.

DESCRIPTION OF THE PREFERRED EMBODIMENT

Figure 1:
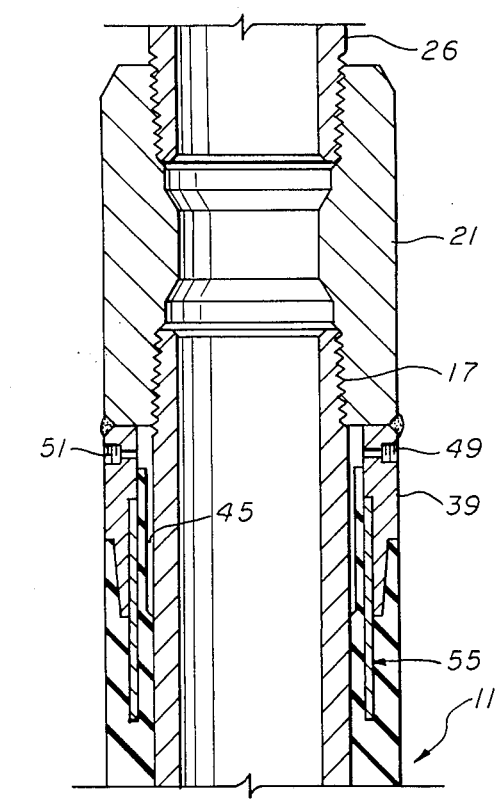
FIG. 1 is a sectional view of an inflatable packer to which the method of the present invention has application.
Figure 1:
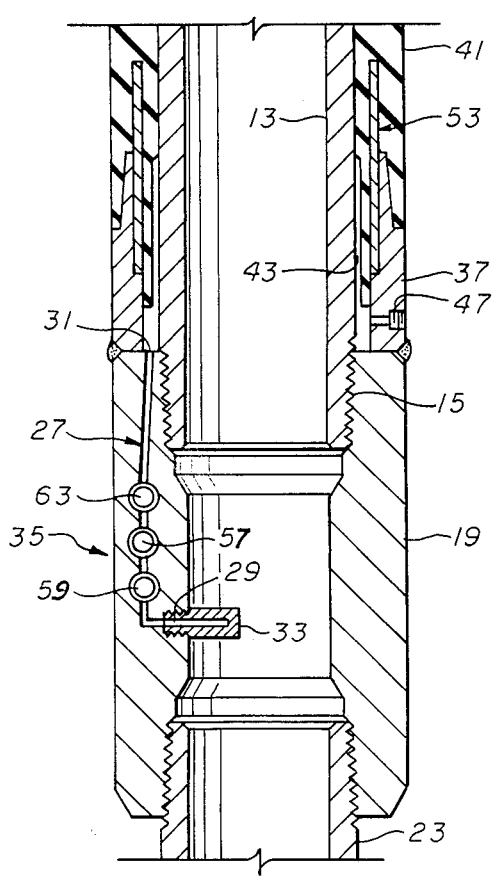

Referring now to the drawing, and first to FIG. 1, an inflatable packer is designated generally by the numeral 11. Inflatable packer 11 includes a tubular mandrel 12, which in the preferred embodiment is a length of casing or the like having threaded portions 15 and 17 at its respective ends. Threaded portions 15 and 17 are adapted to receive and connect with, respectively, a valve collar 19 and a blank collar 21, which in turn are adapted to be connected between adjacent other tubular members 23 and 26, respectively, to form a string of pipe.

Valve collar 19 is of the type disclosed generally in U.S. Pat. No. 3,437,142, and includes a passageway, designated generally by the numeral 27, having an inlet 29 and an outlet 31, for the flow of inflating fluid therethrough. Prior to inflation, inlet 29 is closed by a frangible knockoff plug 33 which is adapted to be broken off by a cementing plug or the like, thereby to open inlet 29. Valve means, designated generally by the number 35, are provided for allowing the flow of inflating fluid through passageway 27 when the differential inflating fluid pressure with respect to well bore pressure is within a certain preselected range and for preventing the flow of fluid from outlet 31 to inlet 29.

Inflatable packer 11 includes a pair of spaced apart heads 37 and 39, which are connected, as by welding, to collars 19 and 21, respectively, the combination of the heads and collars sometimes being referred to as end assemblies. An inflatable sleeve 41 of a rubber-like elastomeric material is positioned about tubular mandrel 13 and connected between heads 37 and 39. The sleeve is preferably formed in place by wrapping mandrel 13 with strips of the rubber-like material, and then curing material to form a unitary sleeve. Heads 37 and 39 are radially spaced apart from mandrel 13 to form annular chambers 43 and 45, respectively. Head 37 includes a normally plugged access port 47, which in the preferred embodiment is substantially diametrically opposed to valve means 35, for allowing access to chamber 43. Upper head 39 includes a pair of preferably diametrically opposed normally plugged access ports 49 and 51, which allow access to chamber 45.

Heads 37 and 39 have connected thereto longitudinally extending reinforcing elements, designated generally by the numerals 53 and 55, respectively. In the preferred embodiment, reinforcing elements 53 and 55 each comprise a plurality of longitudinally extending overlapping ribs connected at one end to a head and extending into the material of inflatable sleeve 41. As inflatable sleeve 41 is inflated, the ribs of reinforcing elements 53 and 55 separate and expand, thereby to reinforce the ends of inflatable sleeve 41.

Figure 2:
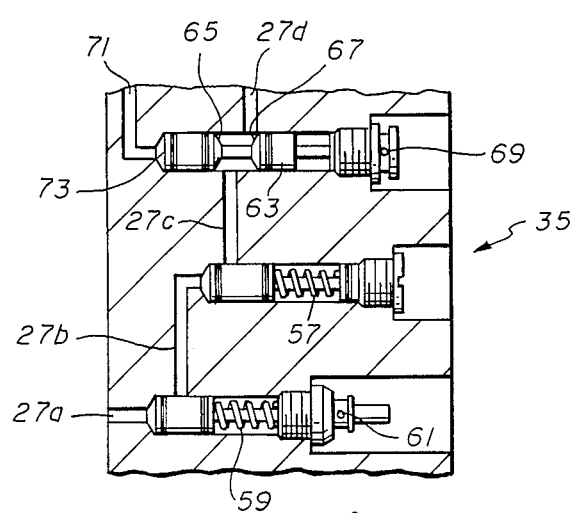
FIG. 2 is a detailed view of the valving arrangement of the inflatable packer in FIG. 1.

Referring now to FIG. 2, there is shown in detail a preferred arrangement of valve means 35 and passageway 27. Passageway 27 includes a first portion 27a, which is connected to inlet 29, a first intermediate portion 27b, a second intermediate portion 27c, and a final portion 27d, which is connected to outlet 31. Valve means 35 includes a plurality of valve pockets which interrupt and separate the various portions of passageway 27 and which are adapted to receive valves. A shear valve 59 is held normally closed by a shear pin 61, which is adapted to shear and allow shear valve 59 to open when the pressure differential between inflating fluid in first portion 27a of passageway 27 exceeds by a preselected amount the well bore pressure exterior of shear valve 59, thereby to communicate first portion 27a with first intermediate portion 27b. Shear valve 59 may preferably be spring loaded, thereby to provide a check valve in valve means 35. Valve means 35 may also include an auxiliary or backup spring loaded check valve 57 interposed between first intermediate portion 27b and second intermediate portion 27c of passageway 27, which is adapted to permit the flow of inflating fluid in only one direction from first intermediate portion 27b to second intermediate portion 27c. Valve means 35 also preferably includes an inflation limit valve 63, which s positioned in a valve pocket between second intermediate portion 27c and final portion 27d of passageway 27. Inflation limit valve 63 includes surfaces 65 and 67 which are of substantial equal area and are normally spaced apart so as to communicate second intermediate portion 27c with final portion 27d. Inflate limit valve is held in such normal position by a shear pin 69. Since opposed surfaces 65 and 67 are of substantially equal area, the pressure of inflating fluid therebetween does not provide any net force tending to shift the position of inflation limit valve 63. An inflation pressure passageway 71 is provided which communicates with chamber 43 and, generally, with the area between inflatable sleeve 41 and mandrel 13. Inflation limit valve 63 includes a surface 73 to which s applied pressure between from inflation pressure passageway 71. When the inflation pressure passageway 71 exceeds the well bore pressure by a preselected amount, shear pin 69 shears to allow inflation limit valve 63 to move to isolate inflation pressure passageway and final portion 27d of passageway 27 from second intermediate portion 27c, thereby to limit the inflation of inflatable sleeve 41.

Figure 3:
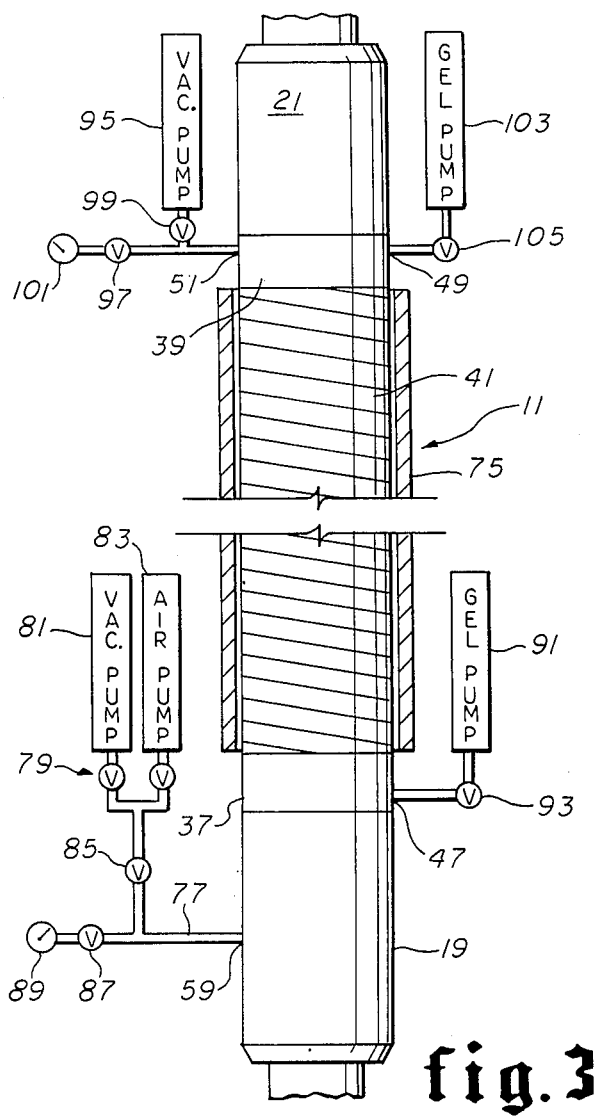
FIG. 3 is a schematic view showing an arrangement of apparatus for practicing the method of the present invention.

The method of preparing inflatable packer 11 for running may be understood by referring to FIG. 3. Packer 11 is placed in a safety tube 75, which is preferably a piece of steel pipe having an inside diameter somewhat larger than the outside diameter of the uninflated sleeve 41. Safety tube 75 is substantially the same length as the external portion of sleeve 41 extending between heads 37 and 39 and is positioned so as to expose heads 37 and 39 and collars 19 and 21. Backup check valve 57 is then removed from its associated valve pocket and is replaced by a pump adapter 77. Pump adapter 77, which is a conduit, is connected to a pump assembly, designated generally by the numeral 79. Pump assembly 79 includes a vacuum pump 81 and an air pump 83. Vacuum pump 81 is chosen to have a capacity sufficient to pull a substantial vacuum, which in the preferred embodiment is on the order of 25 inches. Air pump 83 is selected to have a capacity sufficient to produce air pressure of at least 125 p.s.i.g. Pump assembly 79 also includes appropriate conduits for connecting vacuum pump 81 and air pump 83 to pump adapter 79 and includes valves 85 and 87 and a pressure-vacuum gauge 89. A gel pump 91 is connected to lower head 37 through access port 47. Gel pump 91 is preferably a grease gun of the commercial type which is adapted to hold and pump a substantially incompressible fluid which is referred to as gel. Preferably, the gel is a viscous fluid having the properties of a high melting point grease. The gel flows like a fluid under pressure but will not flow substantially at atmospheric pressure. Examples of preferred gels are molybdenum disulfide grease and shell DARINA grease. Gel pump 91 is connected to access port 47 by a suitable conduit having a valve 93 therein.

A vacuum pump 95 having characteristics similar to those of vacuum pump 81 is connected to upper head 39 through access port 51 by a suitable conduit which includes valves 97 and 99. A vacuum gauge 101 is also provided. A gel pump 103 having characteristcs similar to those of gel pump 91 is connected to upper head 39 through access port 49 by a suitable conduit including a valve 105. Gel pump 103 contains a gel similar to that which fills gel pump 91.

After the various pumps have been connected, valves 85 and 87 are opened and air pump 83 is actuated to partially inflate sleeve 41 and expand it into contact with safety tube 75. Such partial inflation separates sleeve 41, which was preferable formed inplace on mandrel 13, from mandrel 13. Preferably, the pressure within packer 11 is raised to about 125 p.s.i.g., whereupon valve 85 is closed and air pump 83 is deactuated. A test pressure of 125 p.s.i.g. is less than that conventionally used during hydrostatic testing of packers. However, since the test fluid is air, rather than water, leaks may be detected at lower pressure differentials. Pressure-vacuum gauge 89 may be monitored for a period, as for example five minutes. If the pressure remains constant for suc hperiod, then the system is leak free. If the pressure drops, then there is a leak. The most common areas for leaks to occur are at the welded connection between the collars and the leads and at the connection of sleeve to the heads. Leaks may be readily located by appying a soapy solution to the exposed parts of the packer. The presesnce of leaks will be indicated by bubbles.

After pressure testing, the test air is bled off and sleeve 41 returns to contact mandrel 13. Then, valves 85 and 87 of pump assembly 79 and valves 97 and 99 associated with vacuum pump 95 are opened and vacuum pumps 81 and 95 are actuated to exhaust substantially all of the air in the end assemblies. After a substantial vacuum, as for example 25 inches, has been drawn, valves 85 and 99 are closed and vacuum pumps 81 and 85 are deactuated. Gauges 89 and 101 should be monitored for a time to make sure the vacuum is retained. Any loss of vacuum most probably indicates a leak in one of the pump assemblies or associated valves and conduits. After the integrity of the vacuum has been checked, valves 93 and 105 are opened and gel is pumped under pressure from gel pumps 91 and 102 into heads 37 and 39. Since substantially all gases have been removed from chambers 43 and 45 and passageway 27 the gel may be forced into substantially every void space in the end and passageway 27. After the flow of gel under atmospheric pressure ceases, a small additional amount of gel is pumped into heads 37 and 39 to insure complete filling.

After the end assemblies have been gel filled, the pump assemblies are removed and check valve 57 and the various access port plugs are replaced. Then, packer 11 maybe connected into a pipe string and inserted into a well bore. The substantially incompressible gel in the end assemblies protects the heads against collapse. Since there is no fluid between inflatable sleeve 41 and mandrel 13, the coefficient of friction therebetween is alwasy at least as great as the coefficient of friction that may develop between the exterior of the sleeve and the well bore wall. Moreover, since there is no liquid between the sleeve and the mandrel, there is no balance of hydrostatic forces inside and outside the sleeve. Therefore, the deeper the packer goes into the well bore, the greater will be the normal force due to hydrostatic well bore pressure, and, consequently, the greater the frictional forces that will be developed between the mandrel and the sleeve.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompany drawings is to be interpreted as illustrative and not in a limiting sense.

What is claimed is:

1. A method of preparing an inflatable packer for insertion into a fluid filled well bore, said inflatable packer including a tubular mandrel, a pair of spaced apart collars connected to the mandrel, each of said collars having connected thereto an annular head, said heads being radially spaced apart from said mandrel to define respective chambers, one of said collars including a passageway for conducting inflating fluid from inside said one collar into one of said chambers, and an inflatable sleeve connected to and extending between said heads about said mandrel, which comprises the steps of:

exhausting substantially all of the fluid from each of said chamber and said passageway in said one collar to form substantial vacuums therein;

and filling said exhausted chambers and passageway with a substantially incompressible fluid.

2. The method as claimed in claim 1, wherein said substantially incompressible fluid is a viscous fluid that flows under pressure greater than atmospheric but will not flow out of said chambers when said packer is vertical and atmospheric pressure.

3. The method as claimed in claim 1, wherein said substantially incompressible fluid has the properties of grease.

4. The method as claimed in claim 1, including the steps of:

prior to said exhausting step, inflating said packer with gas to expand said sleeve radially away from said mandrel to check for leaks.

5. The method as claimed in claim 4, wherein said gas inflating step includes the steps of:

positioning a substantially rigid tube about said inflatable sleeve;

injecting gas between said sleeve and said mandrel to expand said sleeve against said tube and raise the pressure between said sleeve and mandrel substantially above atmospheric.

6. The method as claimed in claim 5, wherein said inflating step includes the step of applying the connections between said collars and heads and said heads and inflatable sleeve a solution that forms bubbles around any leak.

7. The method as claimed in claim 5, wherein said inflating step includes the step of maintaining the pressure between said sleeve and mandrel for a preselected time and monitoring said pressure.

8. An inflatable packer, which comprises:

a tubular mandrel;

a pair of spaced apart annular collars connected to the tubular mandrel, each of said collars having an annular head connected thereto, said heads being radially spaced apart from said mandrel to define respective chambers, one of said collars including a passageway for conducting inflating fluid from inside said one collar into one of said chambers, said chambers and passageway being filled with a substantially incompressible fluid;

and an inflatable sleeve connected and extending between said heads in intimate liquid-free contact with said tubular mandrel.

9. A method for preparing an inflatable elongated packer for transportation through a well bore containing a well control fluid where the packer element on the inflatable packer device has a substantial comprising the steps of:

at the surface of the earth, preparing an inflatable packer having a central supporting mandrel, a tubular elastomer packer element over the supporting mandrel and means sealingly attaching the ends of the packer element to the supporting mandrel where there are annular cavities between the supporting mandrel and packer element at each end by (a) reducing the pressure in the annular cavities and between the supporting mandrel and packer element to a pressure below atmospheric pressure so that there is no liquid between the packer element and supporting mandrel, and (b) filling the sub-atmospheric annular cavities with substantially incompressible, highly viscous fluid so that the cavities are completely filled with the incompressible fluid.

10. The method as set forth in claim 9 wherein the incompressible fluid has a viscosity sufficient to prevent migration of the incompressible fluid at atmospheric pressure and a vertical position of the packer.

11. The method as set forth in claim 9 wherein prior to the steps (a) and (b) the packer is inserted into a testing pipe and the packer element is inflated in the testing pipe by a testing gas to a pressure and for a time period sufficient ot determine whether there is any leakage of gas from the inflated packing element, and thereafter deflating the packer element by reducing the testing gas to atmospheric pressure.

12. An inflatable packer for use in a fluid filled borehole traversing earth formations comprising:

an elongated supporting mandrel adapted for connection to a string of pipe;

an elongated elastomer packing element disposed over said supporting mandrel and having a length of at least ten feet;

means sealingly attaching the packing element at each of its ends to said supporting mandrel and having cavities therein for receiving inflating liquid under pressure;

means for reinforcing each of the ends of said packing element upon inflation of said packing element relative to said supporting mandrel;

means for selectively admitting inflating liquid under pressure from the interior of the supporting mandrel to said cavities and between the packing element and supporting mandrel for inflating said packing element into sealing engagement with the wall of a well bore;

said packing element along said supporting mandrel, prior to operation of the means for selectively admitting fluid, being substantially devoid of liquid and said cavities being filled with a substantially incompressible, high viscosity, fluid which does not imgrate at atmospheric pressure.

* * * * *